(12) United States Patent
V et al.

(10) Patent No.: US 10,785,703 B1
(45) Date of Patent: Sep. 22, 2020

(54) PREVENTING CONNECTIONS TO UNAUTHORIZED ACCESS POINTS WITH CHANNEL SWITCH ANNOUNCEMENTS

(71) Applicant: Fortinet, Inc., Sunnyvale, CA (US)

(72) Inventors: Vijayakumar V, Ulsoor (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/454,015

(22) Filed: Jun. 26, 2019

(51) Int. Cl.
*H04W 48/02* (2009.01)
*H04W 8/00* (2009.01)
*H04W 48/20* (2009.01)
*H04W 48/14* (2009.01)
*H04W 84/12* (2009.01)

(52) U.S. Cl.
CPC .......... *H04W 48/02* (2013.01); *H04W 8/005* (2013.01); *H04W 48/14* (2013.01); *H04W 48/20* (2013.01); *H04W 84/12* (2013.01)

(58) Field of Classification Search
CPC ..... H04W 48/02; H04W 8/005; H04W 48/14; H04W 48/20; H04W 84/12
See application file for complete search history.

(56) References Cited

U.S. PATENT DOCUMENTS

| 7,346,338 B1* | 3/2008 | Calhoun | H04W 24/02 455/411 |
| 2009/0119776 A1* | 5/2009 | Palnitkar | H04W 12/1206 726/25 |
| 2015/0341789 A1* | 11/2015 | Zheng | H04W 12/12 726/3 |

\* cited by examiner

*Primary Examiner* — Duc C Ho
(74) *Attorney, Agent, or Firm* — Law Office of Dorian Cartwright (57) ABSTRACT

An unauthorized access point is identified during a periodic scan on the wireless network and storing a MAC address for the unauthorized access point and monitored for connection attempts. In response to an attempt by the unauthorized access point to connect to a wireless station or in response to the wireless station attempt to connect to the unauthorized access point, a spoofed probe response is transmitted to prevent a connection. The probe response can include a channel switching element and the MAC address of the unauthorized access point.

2 Claims, 7 Drawing Sheets

| Element ID 410 | Length 420 | Channel Switch Mode 430 | New Channel Number 440 | Channel Switch Count 450 |

PREVENTING CONNECTIONS TO UNAUTHORIZED ACCESS POINTS WITH CHANNEL SWITCH ANNOUNCEMENTS

CROSS-REFERENCE TO RELATED APPLICATIONS

This application is related to U.S. application Ser. No. 13/936,213, filed Jul. 8, 2013, entitled DEAUTHENTICATING AND DISASSOCIATING UNAUTHORIZED ACCESS POINTS WITH SPOOFED MANAGEMENT FRAMES, by Mohan Ram, et al., the contents of which are hereby incorporated by reference in its entirety.

FIELD OF THE INVENTION

The invention relates generally to computer networking, and more specifically, to preventing connections to unauthorized access points with channel switch announcements.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances. Many networks with wireless devices use an access point (AP) with a radio and antenna as an interface between wireless devices and the backbone network which is typically wired. Wireless devices can discover available APs within range of their radios by listening for beacons broadcast by APs which include an identifier such as a basic service set identifier (BSSID). Wireless devices use the identifier in a probe request to initiate a connection to the identified AP.

One problem with networks for wireless devices is that unauthorized access points can be introduced to the system and advertise a connection point to wireless devices. Wireless devices may be unaware of which APs are authorized and unsuspectingly respond to a beacon. This situation causes a serious vulnerability to an entity because the unauthorized access point may then become privy to confidential information transferred to and from unsuspecting wireless devices, allowing data theft. Operators of unauthorized access points may are not always devious. In one case, an employee adds an additional access point to an area with poor coverage, without realizing the consequences.

Furthermore, the unauthorized AP is not subject to policies and procedures promulgated by network administrators through access points. For example, undesirable wireless devices making prohibited data transfers, such as video downloads or chat sessions, can steal network bandwidth from other operations more critical to the entity.

Some techniques detect rogue access points already associated with wireless stations. For example, U.S. Pat. No. 9,681,250 disrupts connections with spoofed management frames. However, these techniques fail to prevent the connection in the first place.

What is needed is a robust technique to preventing initial connections to unauthorized access points with channel switch announcements.

To meet the above-described needs, methods, computer program products, and systems for preventing connections to unauthorized access points with channel switch announcements.

In one embodiment, an unauthorized access point is identified during a periodic scan on the wireless network and storing a MAC address for the unauthorized access point. Beacons are broadcast over the wireless network and include an SSID that identifies the access point. Broadcasts of probe request are detected from a wireless station with the MAC address for the unauthorized access point in order to begin association between the wireless station and the unauthorized access point.

In an embodiment, a spoofed probe response is transmitted to the station in response to the detection. The probe response can include a channel switching element and the MAC address of the unauthorized access point. The channel switching element prevents the station from transmitting to the unauthorized access point for initiating a station association process with the unauthorized AP. A connection can then be initiated by the authorized AP with the wireless station.

Advantageously, unauthorized APs can be automatically disconnected from stations for improved data network operations. Network devices will operate better without interference from rogue devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for preventing connections to unauthorized access points with channel switch announcements.

Systems for Preventing Connections to Unauthorized APs (FIGS. 1-5)

Figure 1:
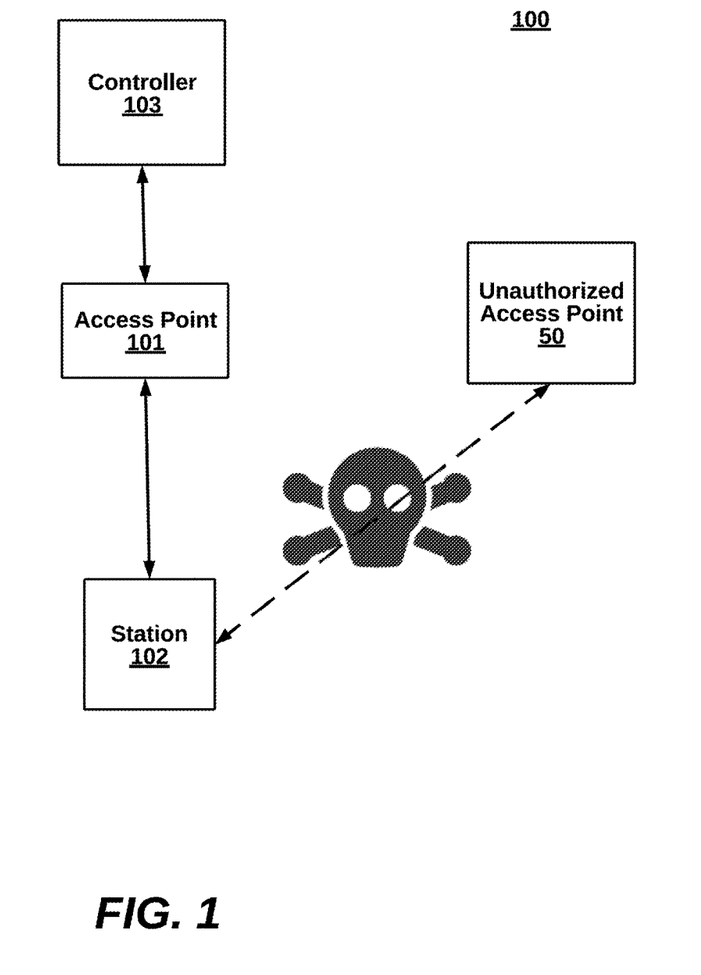
FIG. 1 is a high-level block diagram illustrating a system for preventing connections to unauthorized access points with channel switch announcements, according to one embodiment.

FIG. 1 is a high-level block diagram illustrating a system for preventing connections to unauthorized access points with channel switch announcements, according to one embodiment. The system 100 includes an AP 101, a station 102 and an optional controller 103 coupled in communication with an unauthorized AP 50. Other embodiments of the system 100 can include additional network components that are not shown in FIG. 1. For example, there can be more APs (authorized and unauthorized) and more stations. There can also be network devices such as switches, routers, fire walls, proxy servers, and the like.

Figure 6:
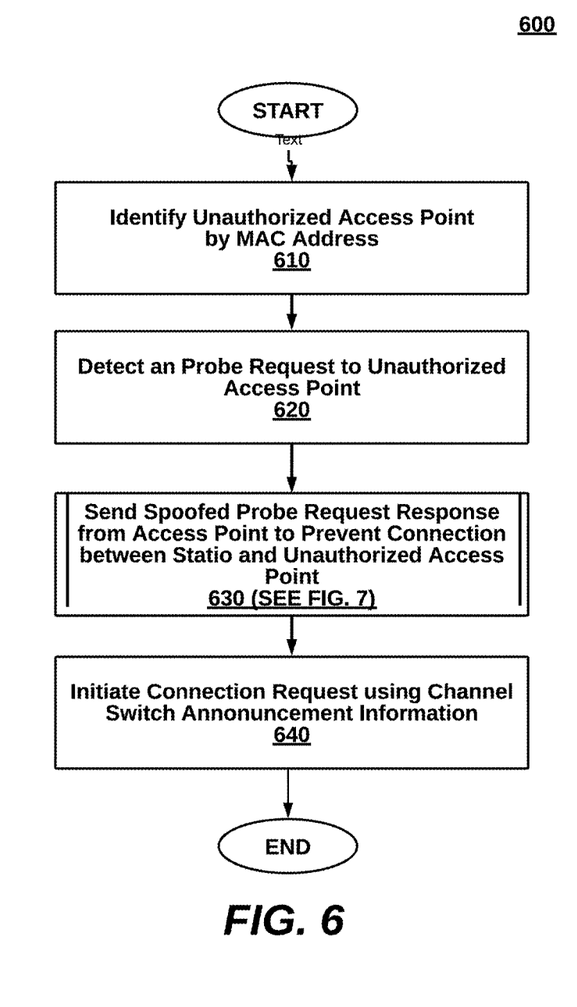
FIG. 6 is a high-level flow diagram illustrating a method for preventing connections to unauthorized access points with channel switch announcements, according to one embodiment.

The AP (or authorized AP) 101 can be any of the computing devices, such as a personal computer, a server blade, any computing environment as shown in FIG. 6. For example, the AP 101 can be an Access Point—Model 101 or an Access Point—Model 433 (modified as discussed herein) by Meru Networks of Sunnyvale, Calif., now Fortinet, Inc. The AP 101 is preferably connected to the network 150 (or to a switch, router, hub, or another AP that is connected to the network 150) via a wired or wireless connection. The AP 101 can be set-up in various configurations with other APs to provide wireless coverage areas. In one embodiment, the functionality is incorporated into a switch or router, and in another embodiment, is incorporated into a custom enclosure. In operation, the AP 101 transmits network packets to and from station 102.

The unauthorized (or rogue) AP 50 can be an identical or similar device to the (authorized) AP 101. The characterization as unauthorized refers to whether or not APs have permission to join a network or communication with a particular station. For example, an employee of a company can bring a personal AP from home and connect it to the wired network backbone to provide better coverage area or strength to a local area network. Also, a data thief can set up a covert access point in a parking lot of a company. In still another example, the unauthorized AP 50 may be friendly to the network, but has not yet completed its own authentication or association in a satisfactory manner because of many reasons. Additionally, an authorized AP can be manually deauthorized by a network administrator or automatically deauthorized due to abnormal behavior (e.g., high network usage).

In some embodiments, the AP 101 prevents initial connections with the unauthorized AP from the station 102 using spoofed management frames, such as responses to probe requests. The requests include a channel switch announcement to cut off further communications to the unauthorized AP. The AP 101, as an authorized member of the wireless network, can then intervene and initiate a connection with the station 102.

There are three states to describe the relationship between APs or unauthorized APs, with mobile stations: 1) unauthenticated and unassociated; 2) authenticated and unassociated; and 3) authenticated and associated. An additional level of IEEE 802.1x authentication is available. Initially both APs and mobile stations are in state 1. After selecting APs for network access, and successful completion of a challenge-response sequence (e.g., WEP shared key authentication), the components move to state 2. Finally, mobile stations associate with APs to move to state 3. Upon receiving a disassociation request, the components return to state 2, or upon receiving a de-authentication request, the components return to state 1 from either state 2 or 3. Messages cannot be exchanged in either states 1 or 2, but the components are preferably returned to state 1 in which the keys and states are deleted and both authentication and association are required to reestablish unauthorized communications.

In still other embodiments, the AP 101 can operate under the direction of the controller 105 in managing the unauthorized APs. The controller 105 (e.g., an MC1500 or MC6000 device by Meru Networks of Sunnyvale, Calif., now Fortinet, Inc.) is above the AP 101 in a network hierarchy, allowing the controller 105 to provide high-level management of the AP 101 and other APs in the network 150. For example, the controller 105 can maintain a list of unauthorized BSSIDs and/or MACs and periodically check for reconnections. In another example, when an unauthorized connection with one mobile station is discovered, the controller 105 can direct other APs to check their coverage areas for the same unauthorized AP. Moreover, the controller 105 can maintain a list of overrides (e.g., not officially authorized APs) to stop the AP 101 from initiating a disconnection. Additional embodiments of the AP 101 are set forth below in FIG. 2.

The station (or mobile station, STA, client or wireless device) 102 can be, for example, a personal computer, laptop computer, tablet computer, smart phone, mobile computing device, Internet appliance, end station or any other computing device as described in FIG. 6. Station 102 is wirelessly couples to APs using a radio and antenna. No pre-configuration or client is needed. The station 102 operates according to wireless standards such as IEEE 802.11a, b, g, n, ac, w or any other wireless standard. The station 102 sends and/or receives network packets for applications being executed. Embodiments of the station 102 are discussed in more detail below in association with FIG. 3.

Figure 2:
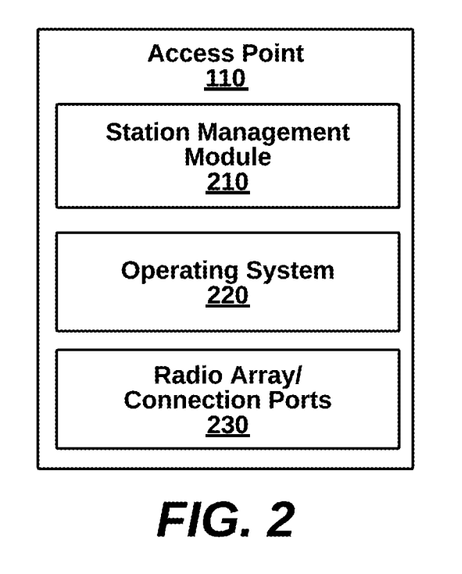
FIG. 2 is a more detailed block diagram illustrating an AP of the system of FIG. 1, according to one embodiment.

FIG. 2 is a more detailed block diagram illustrating the (authorized) AP 101 of the system of FIG. 1, according to one embodiment. The AP 101 includes a station management module 210, an operating system 220, and a radio array/connection ports 230. The components can be implemented in hardware, software, or a combination of both.

The station management module 210 manages station connections by advertising beacons, receiving probe request, sending probe responses and other management frames. Further, individual stations can be tracked as to bandwidth usage, QoS, BSSID assignment, and the like. Beacons and probe responses can also be modified by the station management module 112 to include channel switch announcement information The operating system 220 interfaces between the software and hardware of the AP 101. The operating system 114 can also include integrated applications. The operating system 114 can handle connections to stations by sending out beacons.

The radio array 230 includes one or more transmit (Tx) and receive (Rx) antennas and electronics (e.g., encoders/decoders) for communication with the physical layer.

Figure 3:
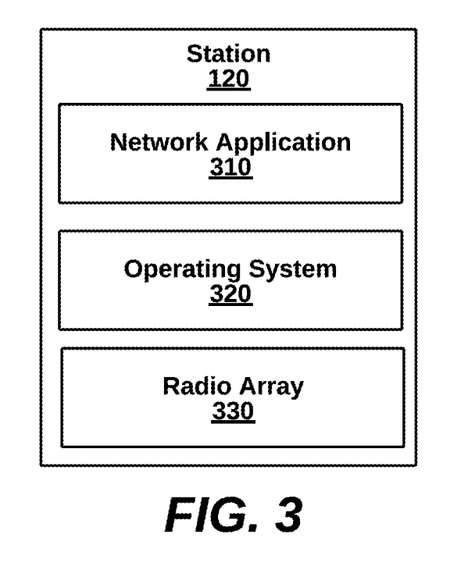
FIG. 3 is a more detailed block diagram illustrating a station of the system of FIG. 1, according to one embodiment.

FIG. 3 is a more detailed block diagram illustrating a station 102 of the system of FIG. 1, according to one embodiment. The station 102 comprises a network application 310, an operating system 320, and a radio array 330. The components can be implemented in hardware, software, or a combination of both.

The network application 310 can be any application executing on the station 102 that makes use of network access in operation. Examples of the network application 310 include a network browser, a VOIP telephone service, a streaming video player, a database viewer, a VPN client, and the like.

The operating system 320 is responsible for connecting to a communication channel for data exchange, among other tasks. To do so, the operating system 320 listens for beacons broadcast by APs, and generates a probe request to connect to a selected AP. After connecting, the operating system 124 exchanges data packs and unpacks data packets in accordance with, e.g., a TCP/IP stack. More particularly, IEEE 802.11-type packets (e.g., IEEE 802.11ac packets) can be generated and received.

The radio array 330 includes one or more transmit (Tx) and receive (Rx) antennas and electronics (e.g., encoders/decoders) for communication with the physical layer.

Figure 4:
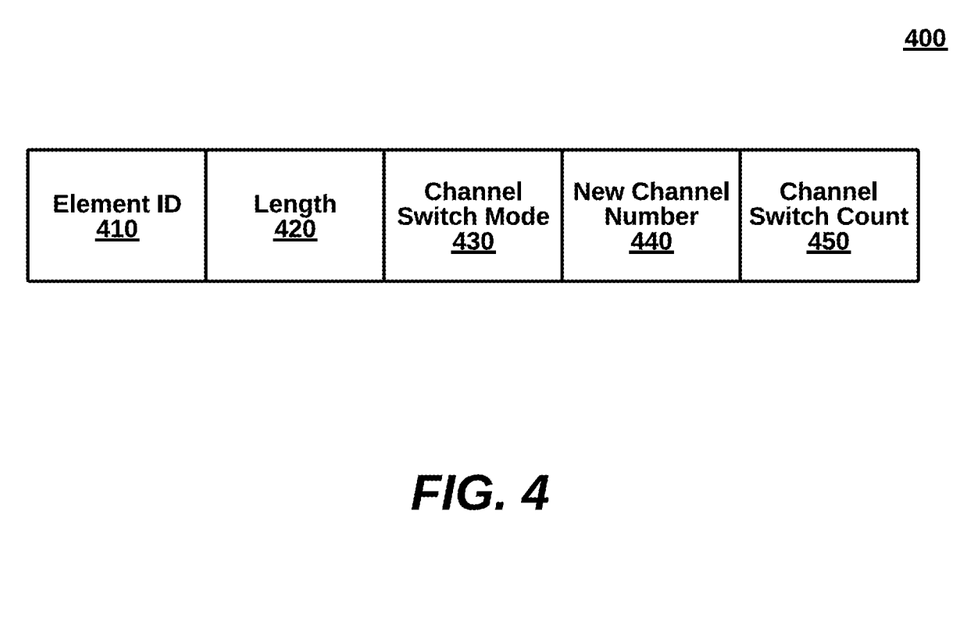
FIG. 4 is a block diagram illustrating a Chanel Switch Announcement information element, according to one embodiment.

FIG. 4 is a block diagram illustrating a Channel Switch Announcement information element 400, according to one embodiment. The Channel Switch Announcement information element includes an element ID field 410, a length field 420, a channel switch mode field 430, a new channel number field 440 and a channel switch count field 450.

The channel switch mode field 430 is set to 1 to stop mobile stations from transmitting frames until the channel switch has occurred. When set to 0, there is no such restriction. The channel number field 440 assigns a specific channel of the available bandwidth for switching. The channel switch count field 450 describes a certain number of beacon frame transmission intervals for the channel switch. When set to 0, the channel switch may occur without any further warning.

Figure 5:
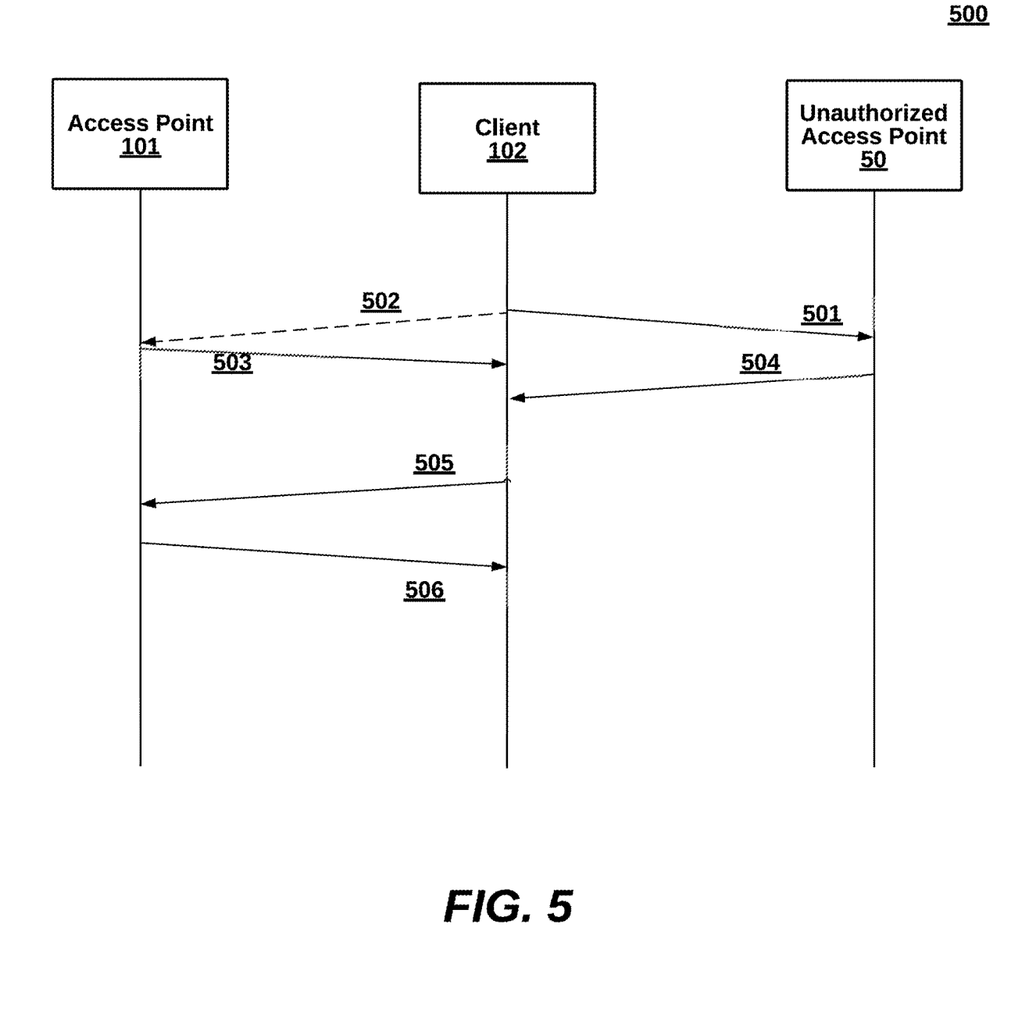
FIG. 5 is a sequence diagram illustrating interactions between the elements of FIG. 1, according to one embodiment.

FIG. 3 is a component interaction diagram illustrating a communication sequence for preventing connections with unauthorized APs with channel switch announcement information, according to one embodiment.

At interaction 501, the client 102 sends an probe request to the unauthorized access point 50 in order to initiate a connection. At interaction 502, access point 101 also detects the request to connect. In response, at interaction 503 access point 101 quickly sends a spoofed response to the probe request, using the MAC address of the unauthorized access point 50. This preferably occurs prior to interaction 504, in which the unauthorized access point 50 sends its actual response to the probe request. Further communications for connection occur in interactions 505 and 506 representing a series of steps occurring for an authenticated connection between an access point and a wireless station.

Figure 7:
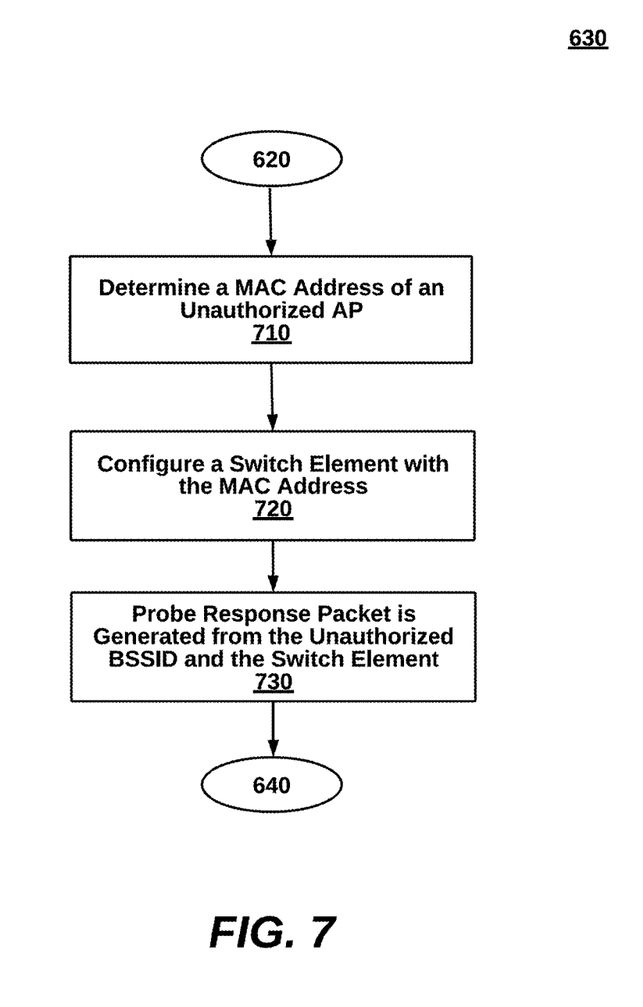
FIG. 7 is a more detailed flow diagram illustrating a step of preventing connection between the client and the unauthorized AP, from in the method of FIG. 6, according to one embodiment.

Methods for Preventing Connections to Authorized (FIGS. 6-7)

FIG. 6 is a high-level flow diagram illustrating a method 600 for preventing connections to unauthorized access points with channel switch announcements, according to one embodiment. The method 600 can be implemented by, for example, an authorized AP (e.g., AP 101 of FIG. 1).

At step 610, unauthorized access points are identified by MAC address. Some are identified by an access point scanning an area within radio range. Other are identified earlier by a different access point and then spread by a controller to the other access points.

At step 620, a probe request to an unauthorized access point is detected. These probe requests are broadcast, and any receiver can decipher these messages using the appropriate network protocol.

At step 630, a spoofed probe response is sent by the AP to avoid initiating connections to the client from the unauthorized AP. The probe response can include a channel switching element that prevents the client from completing the SA process before a time out, as described below in association with FIG. 7. The AP preferably sends the probe response before the client has time to send a probe response so that client switches channels prior to sending the response. Once the client switches channels, the probe response sent by the client is misdirected away from the unauthorized AP.

At step 640, a connection request initiated from an authorized AP and using the known channel switch announcement information. This should result in a successful connection with the wireless station to the authorized access point rather than the unauthorized access point.

FIG. 7 is a more detailed flow diagram illustrating the step 630 of preventing connection between the client and the unauthorized AP with a spoofed probe response, from the method 600 of FIG. 6, according to one embodiment.

At step 710, a BSSID of the unauthorized AP is determined. In one embodiment, the AP listens to beacons broadcast by APs within radio range. The beacon is then parsed to expose identifiers such as source MAC address and BSSIDs being advertised. Either of these identifiers can be used to, for example, identify BSSIDs that are not recognized as authenticated, or to compare against a list of known unauthorized APs. In another embodiment the AP sends out quiet elements in beacons or probe responses. The quiet element causes stations to stop transmission temporarily so that the channel can be monitored for other activities.

At step 720, a switch element is configured. In one embodiment, a switching mode of the switch element is set to 1 to make sure the client does not send any further frames. One implementation of a switch element is implemented through an ECSA (Extended Channel Switch Announcement) as described in the IEEE 802.11y Amendment, IEEE 802.11h, or IEEE 802.11n, or as described above in FIG. 4. Further, a channel switch count of the switching element can be set to 1 to make the channel switch occur immediately. In some cases, the channel switch element is followed with a new channel number. The number of channels can vary based on the standard. For example, 802.11b/g in the United States utilizes 11 channels while 802.11b/g in Europe utilizes 13 channels. Other configurations of the switch element are possible.

At step 730, a probe response packet is generated from the unauthorized BSSID and the switch element. The packet is falsely configured with the unauthorized BSSID as the source address so that mobile stations listening for packets will operates as if the unauthorized AP is initiating the channel switch. Alternatively, the switch element can be encapsulated in a Channel Switch announcement frame, a beacon frame, or any other suitable manner of communication to mobile stations.

Figure 8:
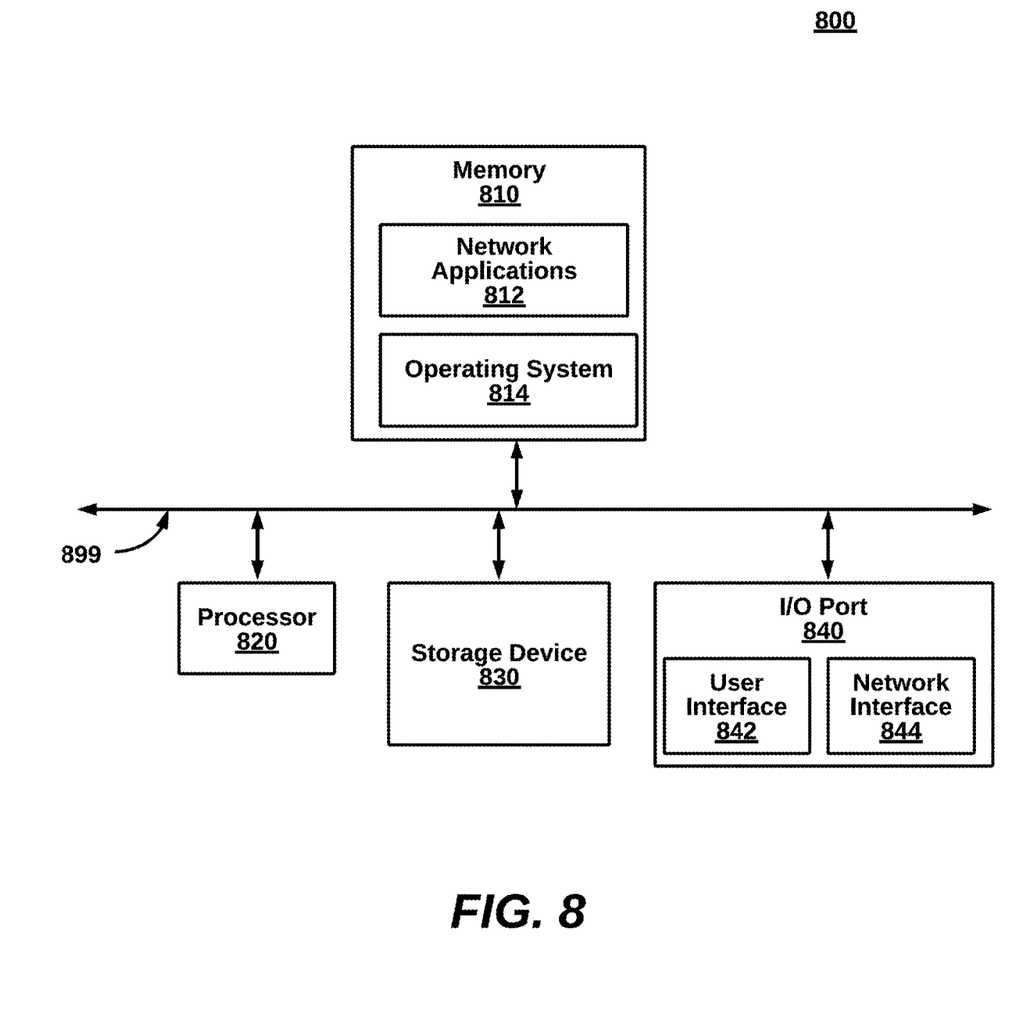
FIG. 8 is a block diagram illustrating an exemplary computing device, according to one embodiment.

Generic Computing Device (FIG. 8)

FIG. 8 is a block diagram illustrating an exemplary computing device 800 for use in the system 100 of FIG. 1, according to one embodiment. The computing device 800 is an exemplary device that is implementable for each of the components of the system 100, including the AP 1-1, and the mobile station 102 and the controller 103. Additionally, the computing device 800 is merely an example implementation itself, since the system 100 can also be fully or partially implemented with laptop computers, tablet computers, smart cell phones, Internet appliances, and the like.

The computing device 800, of the present embodiment, includes a memory 810, a processor 820, a hard drive 830, and an I/O port 840. Each of the components is coupled for electronic communication via a bus 850. Communication can be digital and/or analog, and use any suitable protocol.

The memory 810 further comprises network applications 812 and an operating system 814. The network applications 820 can include the modules of network applications or APs as illustrated in FIGS. 2-4. Other network applications can include 812 a web browser, a mobile application, an application that uses networking, a remote application executing locally, a network protocol application, a network management application, a network routing application, or the like.

The operating system 814 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 810 or the hard drive 830.

The storage device 830 can be any non-volatile type of storage such as a magnetic disc, EEPROM, Flash, or the like. The storage device 830 stores code and data for applications.

The I/O port 840 further comprises a user interface 842 and a network interface 844. The user interface 842 can output to a display device and receive input from, for example, a keyboard. The network interface 844 connects to a medium such as Ethernet or Wi-Fi for data input and output. In one embodiment, the network interface 844 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point (AP) of a data communication network and coupled to a wireless network, for preventing connections to unauthorized access points using channel switch announcements, the method comprising:

identifying, during a periodic scan with a network communication interface, an unauthorized access point on the wireless network and storing a MAC address for the unauthorized access point;

transmitting beacons over the wireless network, the beacons including an SSID that identifies the access point;

detecting broadcast of a probe request from a wireless station with the MAC address for the unauthorized access point in order to begin association between the wireless station and the unauthorized access point;

responsive to the probe request detection, transmitting a spoofed probe response to the station, wherein the probe response includes a channel switching element and the MAC address of the unauthorized access point, the channel switching element preventing the station from transmitting to the unauthorized access point for initiating a station association process with the unauthorized AP; and initiating a connection with the wireless station.

2. A non-transitory computer-readable medium storing instructions that, when executed by a processor, perform a computer-implemented method in an access point (AP) of a data communication network and coupled to a wireless network, for preventing connections to unauthorized access points using channel switch announcements, the method comprising:

identifying, during a periodic scan with a network communication interface, an unauthorized access point on the wireless network and storing a MAC address for the unauthorized access point;

transmitting beacons over the wireless network, the beacons including an SSID that identifies the access point;

detecting broadcast of a probe request from a wireless station with the MAC address for the unauthorized access point in order to begin association between the wireless station and the unauthorized access point;

responsive to the probe request detection, transmitting a spoofed probe response to the station, wherein the probe response includes a channel switching element and the MAC address of the unauthorized access point, the channel switching element preventing the station from transmitting to the unauthorized access point for initiating a station association process with the unauthorized AP; and initiating a connection with the wireless station.

\* \* \* \* \*